US008430423B2

(12) United States Patent
Matsuda et al.

(10) Patent No.: US 8,430,423 B2
(45) Date of Patent: Apr. 30, 2013

(54) INTERIOR STRUCTURE OF VEHICLE

(75) Inventors: Shiori Matsuda, Hiroshima (JP); Mitsutoshi Yamanishi, Hiroshima (JP); Hiroyuki Matsuda, Hiroshima (JP); Keishi Nishimura, Hiroshima (JP)

(73) Assignee: Mazda Motor Corporation (JP)

( * ) Notice: Subject to any disclaimer, the term of this patent is extended or adjusted under 35 U.S.C. 154(b) by 160 days.

(21) Appl. No.: 13/025,917

(22) Filed: Feb. 11, 2011

(65) Prior Publication Data

US 2011/0241321 A1 Oct. 6, 2011

(30) Foreign Application Priority Data

Mar. 31, 2010 (JP) ................................ 2010-081729

(51) Int. Cl.

| | |
|---|---|
| ***B60R 21/232*** | (2011.01) |
| ***B60R 21/2334*** | (2011.01) |
| ***B60R 21/237*** | (2006.01) |
| ***B60R 21/213*** | (2011.01) |
| ***B60R 21/214*** | (2011.01) |

(52) U.S. Cl.
USPC .................. 280/730.2; 280/728.2; 280/743.2

(58) Field of Classification Search ............... 280/730.2, 280/728.2, 730.1, 743.2, 728.1, 749; *B60R 21/232, B60R B60R 21/2334, 21/237, 21/201, 21/213, B60R 21/2155, 21/215, 21/214, 21/20, 21/16*
See application file for complete search history.

(56) References Cited

U.S. PATENT DOCUMENTS

| | | | | |
|---|---|---|---|---|
| 7,380,815 | B2 * | 6/2008 | Rose et al. | 280/730.2 |
| 2009/0127836 | A1 * | 5/2009 | Umeda et al. | 280/730.2 |
| 2010/0032928 | A1 * | 2/2010 | Yamanishi et al. | 280/728.3 |
| 2011/0127755 | A1 * | 6/2011 | Beppu et al. | 280/730.2 |

FOREIGN PATENT DOCUMENTS

| | | |
|---|---|---|
| JP | 2004-314786 | 11/2004 |
| WO | WO 2010007740 A1 * | 1/2010 |

* cited by examiner

*Primary Examiner* — Eric Culbreth
*Assistant Examiner* — Keith Frisby
(74) *Attorney, Agent, or Firm* — Studebaker & Brackett PC; Donald R. Studebaker

(57) ABSTRACT

An interior structure of a vehicle comprises a shock absorbing member attached to a vehicle body inside a roof trim above a pillar trim, a curtain airbag device including a curtain airbag stored in a roof trim and an inflator to supply gas to the curtain airbag, wherein the curtain airbag has a bending portion in which a rear end portion of the curtain airbag bends forwardly in a storage state, a gas supply portion of the inflator is provided in front of the bending portion of the curtain airbag, and the shock absorbing member holds the bending portion of the curtain airbag inserted into an inside from a vehicle front side with an opening, a holding clip and a storage portion.

2 Claims, 4 Drawing Sheets

23
29 31
25
37
35
43
45
27
9
35
35
33
33
33
33
11
41
13
39
29

1
3
5
7
9
11
13
15
17
19
21
23

13
35
27
45
43
41
33
35
33
37
11
25
23
31
29
35
33
29
33
35
39
9

INTERIOR STRUCTURE OF VEHICLE

BACKGROUND OF THE INVENTION

The present invention relates to an interior structure of a vehicle, and in particular, relates to an interior structure of a vehicle which comprises a curtain airbag device arranged inside a roof trim.

Conventionally, an interior structure of a vehicle which comprises a curtain airbag device equipped with a curtain airbag which inflates so as to cover a side window of the vehicle for protecting a passenger seated in a front seat or a rear seat in a vehicle side collision is known as disclosed in Japanese Patent Laid-Open Publication No. 2004-314786, for example. In such an interior structure of a vehicle with the curtain airbag device, it is preferable that the longitudinal length of the curtain airbag be set to be long in order to protect the passenger securely.

However, if the longitudinal length of the curtain airbag is properly long, it may be necessary that a rear end portion of the curtain airbag is positioned rearwardly or inside a relatively-hard rear pillar. Herein, in case of positioning the rear end portion of the curtain airbag rearwardly, the rear end portion of the curtain airbag may improperly interfere with a shock absorbing member, such as a head impact to protect a passenger's head in the vehicle side collision, which is arranged above the pillar trim. Further, in case the rear end portion of the curtain airbag is located inside the rear pillar, the curtain airbag needs to inflate deforming (pushing) the hard rear pillar. Accordingly, the airbag's inflation function may be deteriorated.

SUMMARY OF THE INVENTION

The present invention has been devised in view of the above-described problems, and an object of the present invention is to provide an interior structure of a vehicle which can let the curtain airbag inflate smoothly, securing the properly-long longitudinal length of the curtain airbag.

According to the present invention, there is provided an interior structure of a vehicle, comprising a roof trim covering a ceiling of a vehicle compartment of the vehicle, a pillar trim covering a pillar of the vehicle and arranged below the roof trim, the pillar trim being made from a synthetic resin material which is harder than a material of the roof trim, a shock absorbing member attached to a vehicle body inside the roof trim above the pillar trim, and a curtain airbag device including a curtain airbag extending in a vehicle longitudinal direction and stored inside the roof trim and an inflator to supply gas to the curtain airbag, wherein the curtain airbag has a bending portion in which a rear end portion of the curtain airbag bends forwardly in a storage state, a gas supply portion of the inflator is provided in front of the bending portion of the curtain airbag, and the shock absorbing member comprises a holding structure to hold the bending portion of the curtain airbag inserted into an inside thereof from a vehicle front side.

According to the present invention, since the curtain airbag has the bending portion in which the rear end portion of the curtain airbag bends forwardly, the longitudinal length of the curtain airbag in its inflation state can be longer than that of the curtain airbag in its storage state. Meanwhile, the bending portion of the curtain airbag can be held stably by the shock absorbing member arranged above the pillar trim. Further, this bending portion can be held with the holding structure of the shock absorbing member by being inserted into this holding structure. When the gas is supplied to the curtain airbag in this holding state from the gas supply portion provided in front of the bending portion of the curtain airbag so that the curtain airbag is made to inflate from the vicinity of the gas supply portion, the curtain airbag around the rear end portion is pulled out of the holding structure of the shock absorbing member by part of the curtain airbag around the gas supply portion which has expanded and inflated firstly. Thereby, it can be prevented that the shock absorbing member hinders the inflation of the curtain airbag.

According to an embodiment of the present invention, the bending portion of the curtain airbag is formed by bending the rear end portion of the curtain airbag upwardly. Thereby, the curtain airbag can be held by the shock absorbing member in a state in which the bending portion of the curtain airbag overlaps with part of the curtain airbag located in front of the bending portion. Accordingly, it can be prevented that the width, in a vehicle width direction, of the shock absorbing member expands improperly. Further, by bending the bending portion upwardly so that it overlaps with part of the curtain airbag located in front of the rear end portion vertically, it can be properly prevented that the rear end portion of the curtain airbag is caught by the shock absorbing member when the curtain airbag inflates.

According to another embodiment of the present invention, the interior structure of a vehicle further comprises a connecting member connecting the curtain airbag to the vehicle body, wherein one end of the connecting member is fixed to the bending portion of the curtain airbag or a vicinity of the bending portion of the curtain airbag and the other end of the connecting member is fixed to the pillar of the vehicle, and the connecting member pulls the curtain airbag in an inflation state in the vehicle longitudinal direction. Thereby, the curtain airbag can be connected to the vehicle body via the connecting member and the curtain airbag can be pulled in the vehicle longitudinal direction by the connecting member. Accordingly, the position and shape of the curtain airbag can be properly maintained when the curtain airbag inflates.

According to another embodiment of the present invention, the shock absorbing member comprises a restriction member to restrict a move of the connecting member toward an inside of the vehicle compartment in the inflation state of the curtain airbag. Thereby, since the move of the connecting member toward the inside of the vehicle compartment is restricted by the restriction member in the inflation state of the curtain airbag, the position and shape of the curtain airbag can be properly maintained when the curtain airbag inflates.

Other features, aspects, and advantages of the present invention will become apparent from the following description which refers to the accompanying drawings.

DETAILED DESCRIPTION OF THE INVENTION

Hereinafter, an interior structure of a vehicle according to a preferred embodiment of the present invention will be described referring to the accompanying drawings.

Figure 1:
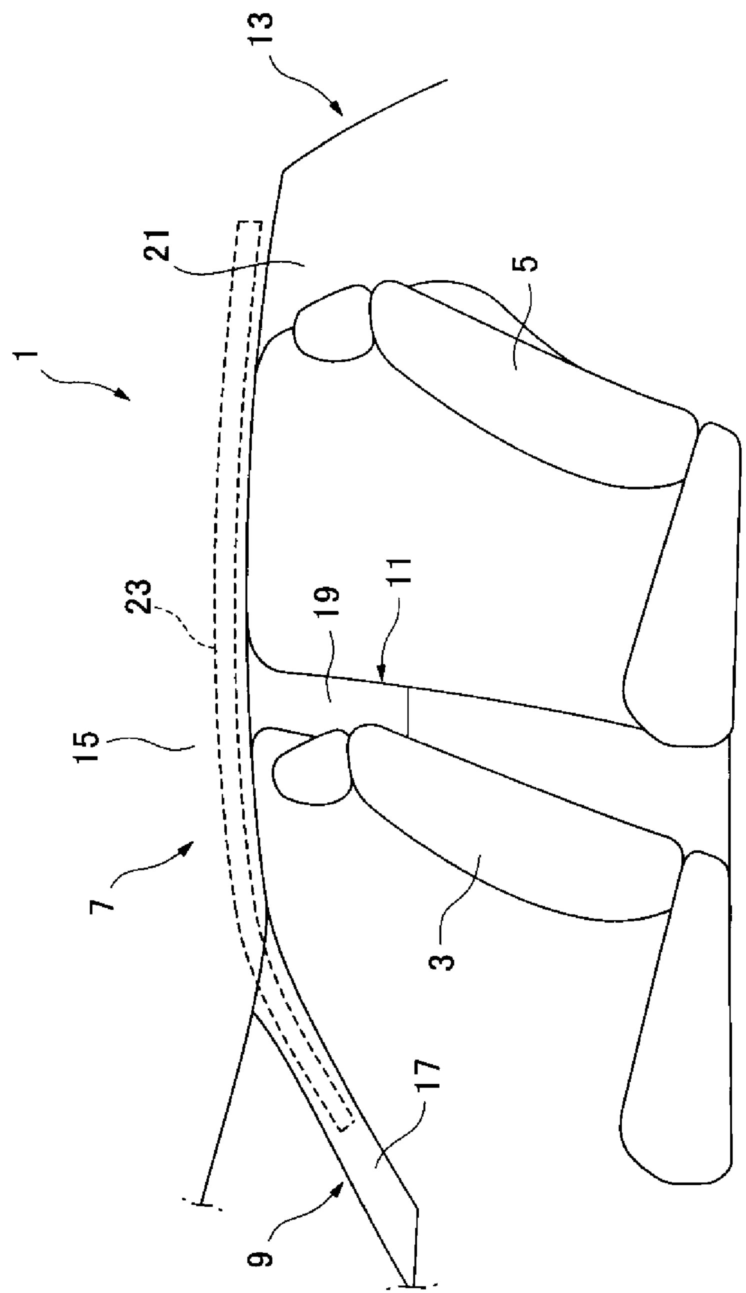
FIG. 1 is a side view of a vehicle compartment of a vehicle equipped with an interior structure according to an embodiment of the present invention.

At first, a basic structure of the interior structure of a vehicle according to the present embodiment will be described referring to FIG. 1. FIG. 1 is a side view of a vehicle compartment. A vehicle 1 comprises a front seat 3 and a rear seat 5 which are arranged in the vehicle compartment as shown in FIG. 1.

The vehicle 1 further comprises a roof 7 which forms a ceiling of the vehicle compartment, and a front pillar 9, a center pillar 11 and a rear pillar 13 which support the roof 7 together. These members form the vehicle compartment. The front pillar 9 is arranged in front of the front seat 3, the center pillar 11 is arranged between the front seat 3 and the rear seat 5, and the rear pillar 13 is arranged in back of the rear seat 5. The roof 7 is covered with a roof trim 15, and the front pillar 9, the center pillar 11 and the rear pillar 13 are covered with pillar trims 17, 19 and 21, respectively.

These pillar trims 17, 19, 21 are made from a relatively-hard synthetic resin material so that they are not broken when being hit by baggage the passenger brings in or out. Meanwhile, the roof trim 15 is made from a softer material than the above-described material of the pillar trims 17, 19, 21 for the reason of less chances of its being hit by the baggage or the like.

The vehicle 1 further comprises a curtain airbag device 23 which is arranged inside the roof trim 15.

Figure 2:
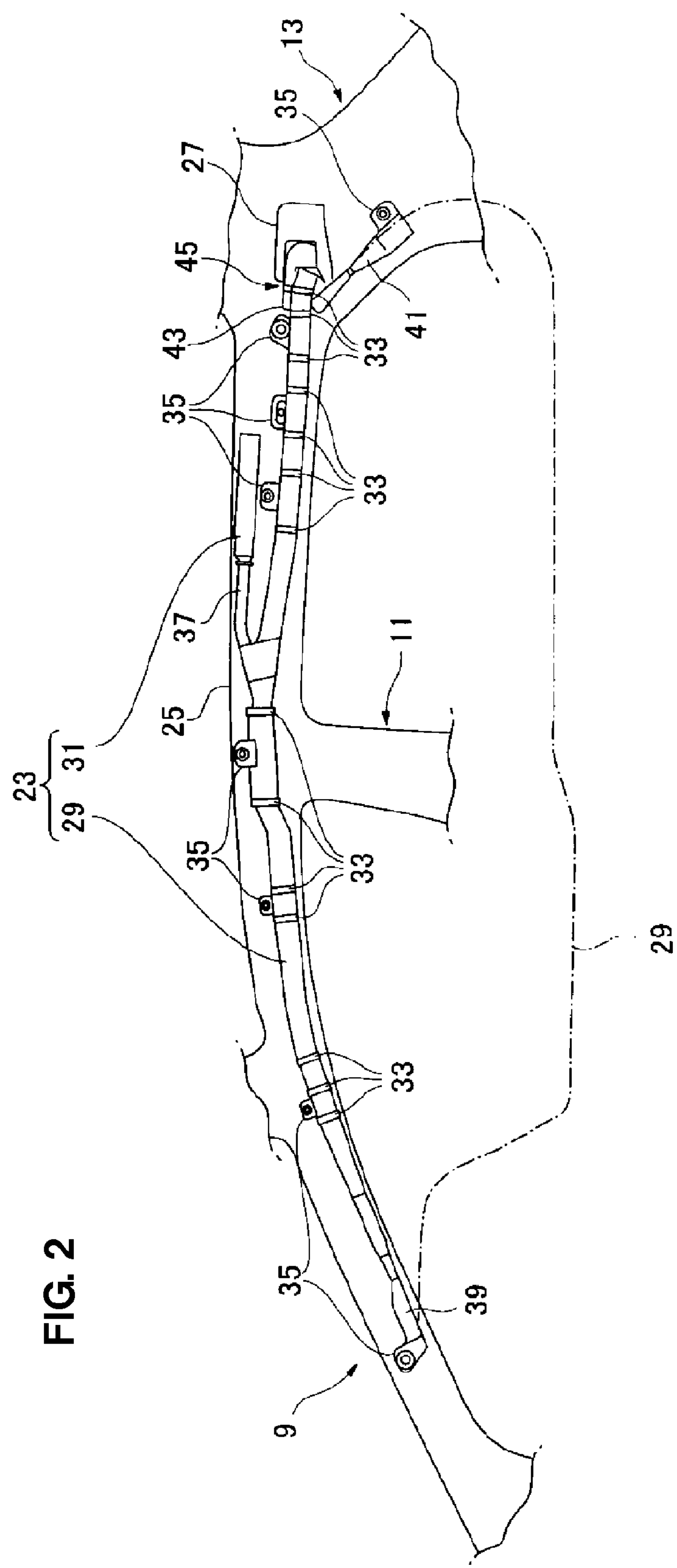
FIG. 2 is a side view of the vehicle compartment of the vehicle equipped with the interior structure according to the embodiment of the present invention in a state in which a roof trim and a pillar trim are removed.

FIG. 2 is a side view of the vehicle compartment in a state in which the roof trim and the pillar trim are removed. The curtain airbag device 23 is attached to a roof side rail 25 which extends from the front pillar 9 to the vicinity of the rear pillar 13 as shown in FIG. 2. Further, a shock absorbing member 27, which is made from a synthetic resin, is attached inside the roof trim 15 above the rear pillar 13 in order to protect a passenger's head in a vehicle side collision.

The curtain airbag device 23 comprises a curtain airbag 29 and an inflator 31 which supplies gas to the curtain airbag 29. The curtain airbag 29 has its longitudinal length which is almost equivalent to the length from the front pillar 9 to the rear pillar 13 and its height which is almost equivalent to the length from the roof 7 of the vehicle compartment to a lower end of a side window. Further, the curtain airbag 29 is folded in a bellows shape and held by tape members 33 which are provided at plural positions, so that it can be stored along the roof side rail 25. The curtain airbag 29 is fixed to the vehicle body via plural attaching brackets 35. A gas supply portion 37 for the gas from the inflator 31 is provided at the curtain airbag 29 near the center pillar 11.

The inflator 31 is arranged above the curtain airbag 29 and supplies the gas to the curtain airbag 29 in accordance with an ignition signal which is inputted from a control device (not illustrated) in the vehicle collision. The curtain airbag 29 inflates so as to cover the side window as shown by a one-dotted broken line.

The curtain airbag 29 comprises a front tether 39 which is provided in an extension direction of the front pillar 9 and a rear tether 41 which is provided along an extension direction of the rear pillar 13 (the rear tether 41 corresponds to a "connecting member" in claims of the present invention). One end of the front tether 39 is fixed to the front pillar 9 via the attaching bracket 35, and the other end is fixed to the curtain airbag 29. One end of the rear tether 41 is fixed to the rear pillar 13 via the attaching bracket 35 and the other is fixed to the curtain airbag 29. These front tether 39 and rear tether 41 pull the curtain airbag 29 in the vehicle longitudinal direction when the curtain airbag 29 inflates, and maintains the inflation shape of the curtain airbag 29.

Further, the rear end portion 43 of the curtain airbag 29 bends forwardly, so that the curtain airbag 29 has a bending portion 45 near its rear end portion. This bending portion 45 is formed by bending the rear end portion 43 of the curtain airbag 29 folded in the bellows shape so that the rear end portion 43 of the curtain airbag 29 is placed onto part of the curtain airbag 29 which is located in front of the rear end portion 43. Thereby, the rear end portion 43 and its vicinity of the curtain airbag 29 overlap with the part of the curtain airbag 29 vertically, thereby forming the bending portion 45. Further, a tape member 33 is provided to surround the bending portion 45 so as to maintain the shape of the bending portion 45. This bending portion 45 is stored inside the shock absorbing member 27 fixed to the vehicle body above the rear pillar 13.

Figure 3:
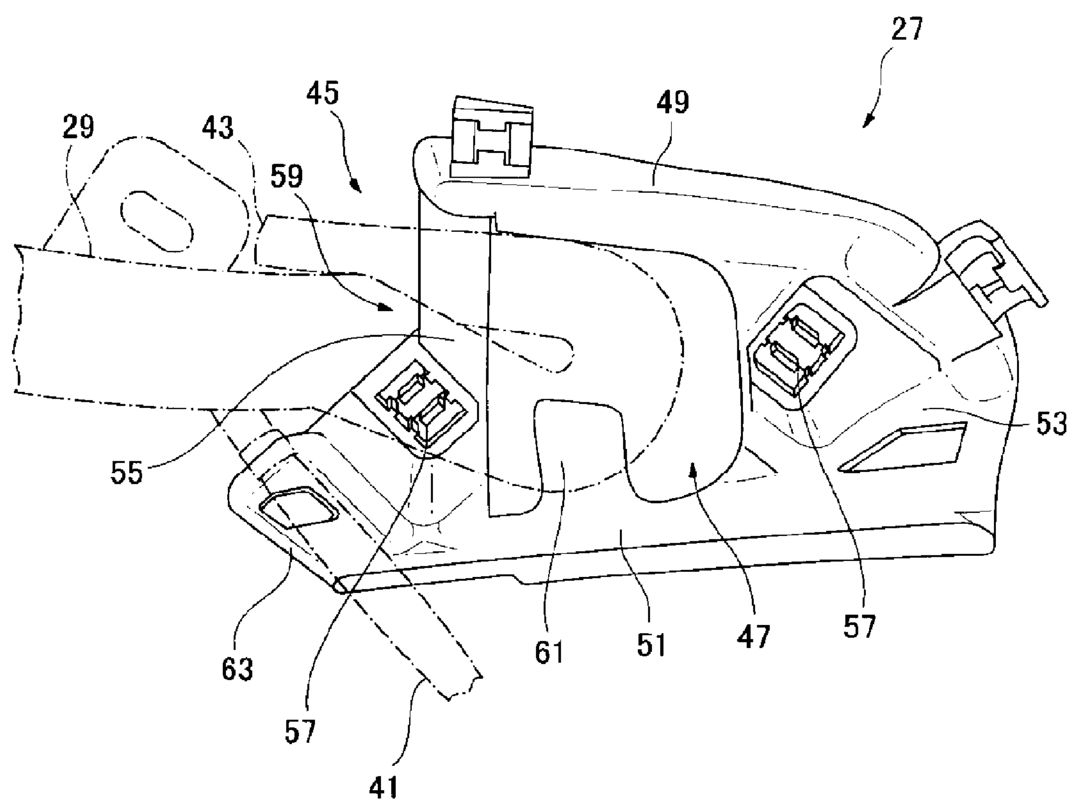
FIG. 3 is a side view showing an impact absorbing member according to the embodiment of the present invention.
Figure 4:
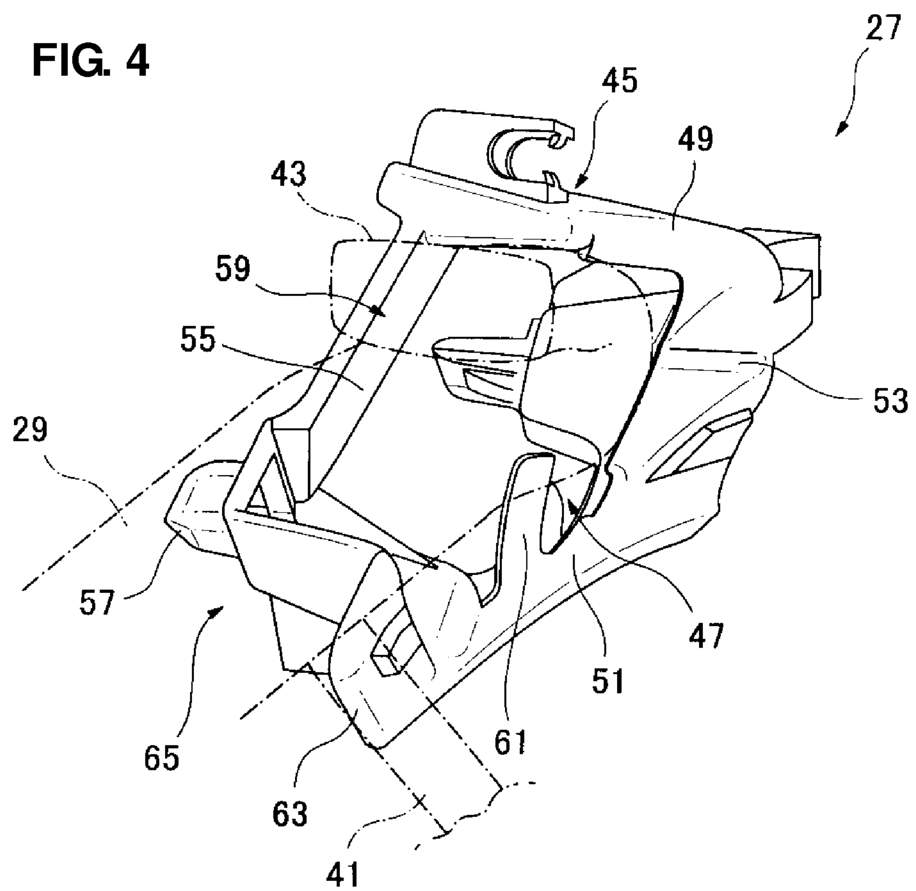
FIG. 4 is a perspective view of the impact absorbing member according to the embodiment of the present invention, when viewed from a vehicle front side.
Figure 5:
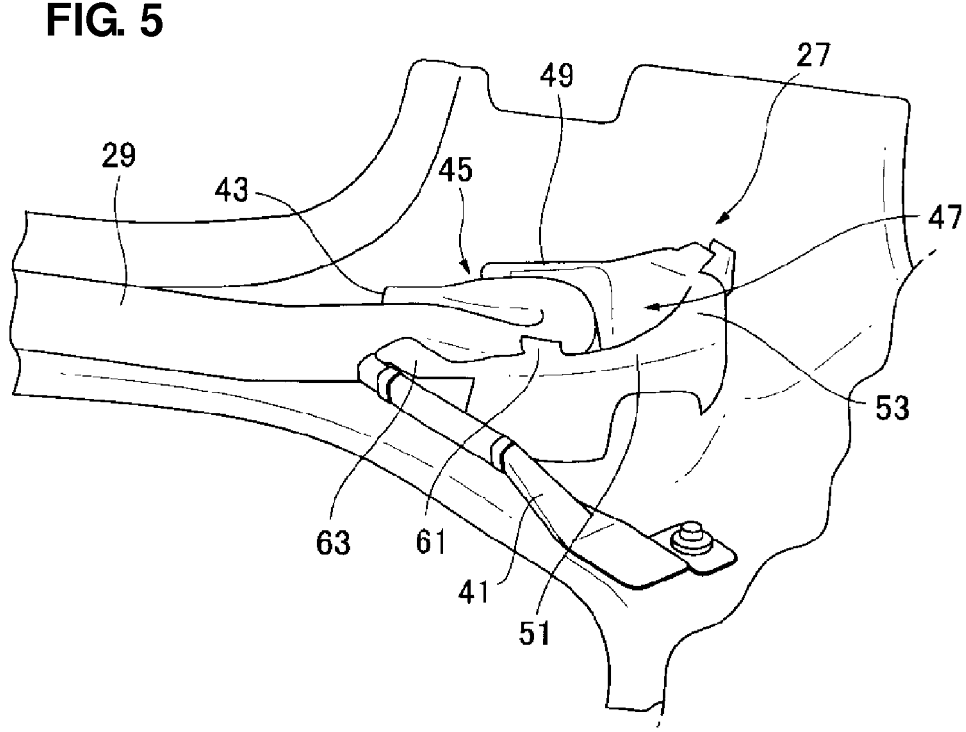
FIG. 5 is a perspective view of the impact absorbing member according to the embodiment of the present invention, when viewed from below.

FIG. 3 is a side view showing the impact absorbing member, FIG. 4 is a perspective view of the impact absorbing member, when viewed from a vehicle front side, and FIG. 5 is a perspective view of the impact absorbing member, when viewed from below. Herein, in the following descriptions about the shock absorbing member, directions which are specified in a state in which the shock absorbing member is attached to the vehicle body are used.

As shown in FIGS. 3 and 4, the shock absorbing member 27 has a storage portion 47 to store the bending portion 45 of the curtain airbag 29 inside it, and this storage portion 47 is comprised of a space which is enclosed by an upper wall 49, a lower wall 51 and a rear end portion 53 which constitutes a rear portion of the shock absorbing member 27. Front end portions of the upper wall 49 and the lower wall 51 are connected by a vertical connecting member 55 which extends vertically at an outward position. And the upper wall 49, the lower wall 51 and the rear end portion 53 have a specified width in the vehicle width direction, and absorb shock (impact) when the passenger's head hits against them. The shock absorbing member 27 is fixed to the vehicle body by inserting a fixing clip 57 which projects outwardly into a fixing hole (not illustrated) which is formed at an attachment face of an inner portion of the roof 7.

The shock absorbing member 27 has an opening 59 to accept the bending portion 45 of the curtain airbag 29 at its front portion, and the bending portion 45 of the curtain airbag 29 is put into the storage portion 47 through this opening 59. Further, a holding clip 61 is provided at an inside of the lower wall 51 forming the storage portion 47 so as to hold the bending portion 45 of the curtain airbag 29 stored in the storage portion 47. This holding clip 61 extends perpendicularly from the lower wall 51. In the shock absorbing member 27 according to the embodiment of the present invention, the opening 59, the holding clip 61 and the storage portion 47 constitute a holding structure to hold the bending portion 45 of the curtain airbag 29.

As shown in FIGS. 3 through 5, the shock absorbing member 27 comprises a restriction member 63 which restricts a move of the rear tether 41 toward an inside of the vehicle compartment. This restriction member 63 is provided on the vehicle front side of a front side end portion of the lower wall 51 and comprised of a wall which extends in the extension direction of the rear tether 41 in parallel to an attachment face of an inner portion of the roof 7 to the shock absorbing member 27. Between this restriction member 63 and the attachment face of the inner portion of the roof 7 is formed a passage 65 through which the rear tether 41 passes. The rear tether 41 passes through this passage 65 and is fixed to the bending portion 45 of the curtain airbag 29 or the vicinity of the bending portion 45. The restriction member 63 restricts the move of the rear tether 41 toward the inside of the vehicle compartment in the inflation state.

By using the shock absorbing member 27 described above, the bending portion 45 at the rear end portion of the curtain airbag 29 can be stably held above the rear pillar 13 as well as protecting the passenger's head in the vehicle side collision. Further, since the curtain airbag 29 is made from cloth, the bending portion 45 of the curtain airbag 29 which is stored in the storage portion 47 of the shock absorbing member 27 does not deteriorate the shock absorption function of the shock absorbing member 27 in case the passenger's head hits against the shock absorbing member 27 in a light vehicle side collision in which the curtain airbag 29 may not be inflated.

Next, the operation and effects of the interior structure described above will be described.

Since the opening 59 is provided on the vehicle front side of the shock absorbing member 27 and the bending portion 45 of the curtain airbag 29 is put into the storage portion 47 of the shock absorbing member 27, passing through this opening 59, the inflation of the curtain airbag 29 is not hindered by the shock absorbing member 27 when the curtain airbag 29 inflates. Specifically, when the vehicle 1 has the side collision, the control device detects this collision and outputs the ignition signal to the inflator 31. Thereby, the inflator 31 ignites and starts supplying the gas to the curtain airbag 29. Herein, since the gas supply portion 37 for the gas from the inflator 31 is formed near the center pillar 11, the curtain airbag 29 starts its inflation with its central portion which is located close to the gas supply portion 37. When the curtain airbag 29 starts inflating its central portion, the central portion of the curtain airbag 29 inflates downwardly, deforming (pushing) the roof trim 15 located below first. Then, the bending portion 45 of the curtain airbag 29 including the rear end portion 43 is pulled forwardly. Accordingly, the bending portion 45 of the curtain airbag 29 moves forwardly and gets out of the opening 59 of the shock absorbing member 27. And once the gas reaches the vicinity of the rear end portion 43 of the curtain airbag 29, the tape member 33 which surrounds the bending portion 45 is broken by the gas pressure, so that the part of the curtain airbag 29 around the rear end portion 43 inflates as well. Herein, since the bending portion 45 is arranged inside the roof trim 15 which is softer than the pillar trim 21, the curtain airbag 29 inflates, deforming the soft roof trim 15, when the part of the curtain airbag 29 around the rear end portion 43 inflates.

According to the interior structure of the vehicle of the embodiment of the present invention, the bending portion 45 of the curtain airbag 29 is formed near the rear end portion 43 of the curtain airbag 29, so that the longitudinal length of the curtain airbag 29 in the inflation state can be longer than that of the curtain airbag 29 in the storage state. Further, the bending portion 45 of the curtain airbag 29 is held by the shock absorbing member 27, so that the whole part of the curtain airbag 29 can be arranged inside the soft roof trim 15. Accordingly, the smooth inflation of the curtain airbag 29 can be provided.

The present invention should not be limited to the above-described embodiment, and any other modifications and improvements may be applied within the scope and sprit of the present invention.

What is claimed is:

1. An interior structure of a vehicle, comprising:

a roof trim covering a ceiling of a vehicle compartment of the vehicle;

a pillar trim covering a pillar of the vehicle and arranged below the roof trim, the pillar trim being made from a synthetic resin material which is harder than a material of the roof trim;

a shock absorbing member attached to a vehicle body inside the roof trim above the pillar trim; and a curtain airbag device including a curtain airbag extending in a vehicle longitudinal direction and stored inside the roof trim and an inflator to supply gas to the curtain airbag, wherein said curtain airbag has a bending portion in which a rear end portion of the curtain airbag bends forwardly in a storage state, a gas supply portion of the inflator is provided in front of said bending portion of the curtain airbag, and said shock absorbing member comprises a holding structure to hold the bending portion of the curtain airbag inserted into an inside thereof from a vehicle front side, a connecting member connecting said curtain airbag to the vehicle body is provided, one end of which is fixed to said bending portion of the curtain airbag or a vicinity of the bending portion of the curtain airbag and the other end of which is fixed to the pillar of the vehicle, and the connecting member pulls the curtain airbag in an inflation state in the vehicle longitudinal direction, and said shock absorbing member comprises a restriction member to restrict a move of said connecting member toward an inside of the vehicle compartment in the inflation state of the curtain airbag.

2. An interior structure of a vehicle, comprising:

a roof trim covering a ceiling of a vehicle compartment of the vehicle;

a pillar trim covering a pillar of the vehicle and arranged below the roof trim, the pillar trim being made from a synthetic resin material which is harder than a material of the roof trim;

a shock absorbing member attached to a vehicle body inside the roof trim above the pillar trim; and a curtain airbag device including a curtain airbag extending in a vehicle longitudinal direction and stored inside the roof trim and an inflator to supply gas to the curtain airbag, wherein said curtain airbag has a bending portion in which a rear end portion of the curtain airbag bends forwardly in a storage state, a gas supply portion of the inflator is provided in front of said bending portion of the curtain airbag, and said shock absorbing member comprises a holding structure to hold the bending portion of the curtain airbag inserted into an inside thereof from a vehicle front side, said bending portion of the curtain airbag is formed by bending the rear end portion of the curtain airbag upwardly, a connecting member connecting said curtain airbag to the vehicle body is provided, one end of which is fixed to said bending portion of the curtain airbag or a vicinity of the bending portion of the curtain airbag and the other end of which is fixed to the pillar of the vehicle, and the connecting member pulls the curtain airbag in an inflation state in the vehicle longitudinal direction, and said shock absorbing member comprises a restriction member to restrict a move of said connecting member toward an inside of the vehicle compartment in the inflation state of the curtain airbag.

* * * * *